United States Patent [19]

Hill et al.

[11] 4,062,917
[45] Dec. 13, 1977

[54] METHOD OF MOLDING RESIN-IMPREGNATED FABRIC LAYER USING RELEASE SHEET AND ABSORBENT SHEET INSIDE EVACUATED BAG

[75] Inventors: Thomas B. Hill, Hartsdale, N.Y.; Charles Tomasino, Greensboro, N.C.

[73] Assignee: Burlington Industries, Inc., Greensboro, N.C.

[21] Appl. No.: 739,195

[22] Filed: Nov. 5, 1976

[51] Int. Cl.² .................. B29D 3/02; B29G 5/00
[52] U.S. Cl. ................................. 264/102; 264/257; 264/313; 264/DIG. 78; 425/85; 425/89; 425/388; 425/389; 425/405 R; 425/DIG. 44; 425/DIG. 60
[58] Field of Search ............... 264/88, 90, 102, 313, 264/316, 257, 101, DIG. 78, 238, 258; 156/285, 286, 323; 425/84, 85, 389, 388, DIG. 44, 60, 420, 405 R; 100/297, 269

[56] References Cited

U.S. PATENT DOCUMENTS

| | | | |
|---|---|---|---|
| 2,923,978 | 2/1960 | Corzine | 264/257 |
| 3,899,967 | 8/1975 | Powers | 100/295 |
| 3,954,931 | 5/1976 | Helmuth et al. | 264/90 |
| 3,962,394 | 6/1976 | Hall | 264/313 |

Primary Examiner—Willard E. Hoag
Attorney, Agent, or Firm—Cushman, Darby & Cushman

[57] ABSTRACT

Fiber reinforced plastic structural components having curved surface areas are produced in molds utilizing a bleeder cloth comprising a textile-like non-woven polyester fabric characterized by a fiber interlock value of at least 7 and a fiber entanglement completeness of at least 0.5. The utilization of this bleeder cloth allows quicker assembly of the mold components since cutting and forming are not necessary, proper pressure transmittal is ensured, and the air permeability, drape, stretchability, and resin holding capacity of the cloth are ideal. For producing the desired structural components with curved surface areas, at least one layer of resin preimpregnated partially cured fabric is disposed in cooperation with a first mold section, a release liner is placed on the fabric, and a bleeder cloth according to the invention is placed on the release liner. A second mold section is placed on the bleeder cloth, and a pressure is applied to all the components of the mold while gases are evacuated through the release fabric and the bleeder cloth while all of the components of the mold are heated to completely cure the resin preimpregnated fabric.

4 Claims, 3 Drawing Figures

U.S. Patent    Dec. 13, 1977    4,062,917
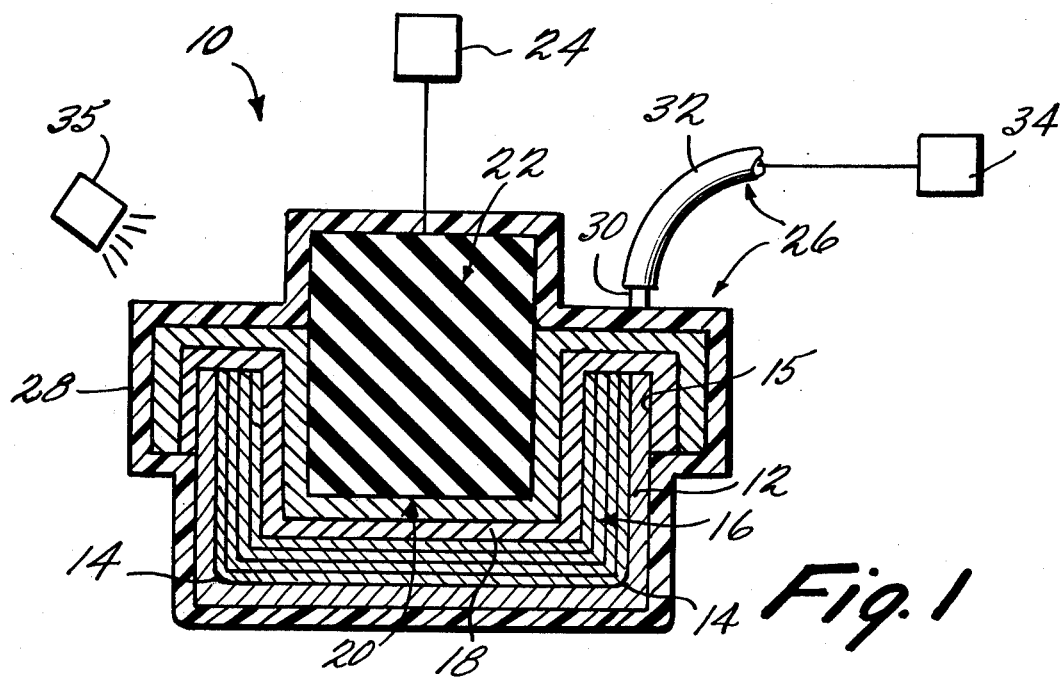
Fig. 1
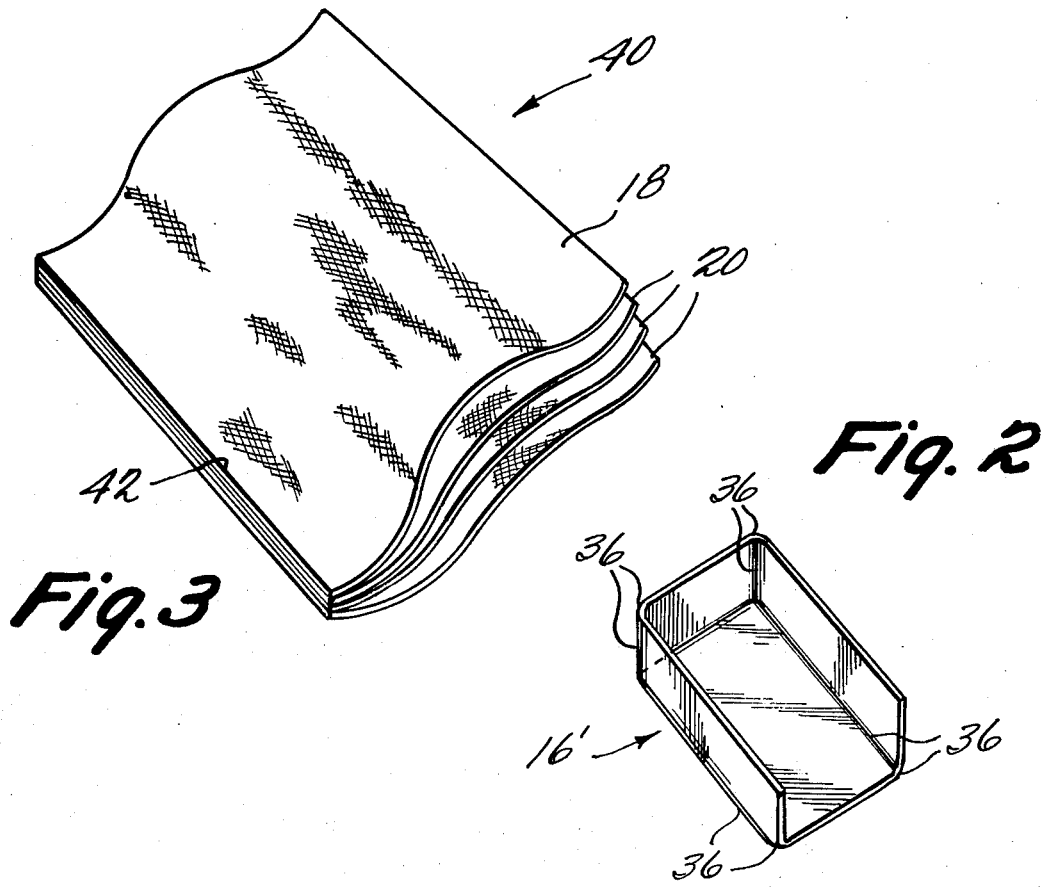
Fig. 2
Fig. 3

METHOD OF MOLDING RESIN-IMPREGNATED FABRIC LAYER USING RELEASE SHEET AND ABSORBENT SHEET INSIDE EVACUATED BAG

BACKGROUND AND SUMMARY OF THE INVENTION

The invention relates to an apparatus and method for making a fiber reinforced plastic structural component having curved surface sections, and the product so produced. Fiberglass, Carbon and Kevlar fiber reinforced plastics can be molded into various structural shapes having excellent strength-to-weight ratios, and can be used for constructing a wide variety of structures. One popular present method of making structural parts from such materials is to pre-impregnate a fabric with an appropriate resin, partially cure the resin to a "B" stage, and bring layers of the pre-impregnated partially cured fabric together into a suitable mold wherein they are completely cured under heat and pressure. The ratio of resin to fiber is important in the final composite, and the density and uniformity of the cured part is affected by the entrapped air and/or other gases formed during the cure cycle. To alleviate the entrapped gas problem and to control the resin content of the final product, a specified amount of partially cured resin is "bled" away from the composite under vacuum while the gases are allowed to escape. One method of controlling the "bleeding" process is the use of a bleeder cloth, the bleeder cloth being placed on a release liner which is disposed on top of the pre-impregnated fabric to be cured. The release liner is open meshed and allows the gases and resin to permeate through the bleeder cloth, and the bleeder cloth then entraps the excess resin.

Presently, woven fiberglass fabric (181 for example) is used as a bleeder cloth. After heat cleaning, such a fabric has the required resin-holding capacity and air porosity to do the job, and is free of any contaminants that might interfere with the curing of the resin. For flat structures, fiberglass does an excellent job, however, for structures requiring curvatures (especially sharp curvatures) the inelastic properties of the woven fiberglass require that the fabric be cut and fitted around the curved areas of the mold. This is a laborious and exacting procedure which sometimes causes an inexact seating of the mold, with defective parts resulting (having excessive voids, inexact contours, etc.).

According to the present invention, a bleeder cloth is used for making structural components of fiber reinforced plastic which does not have the drawbacks mentioned above with respect to fiberglass fabric in the making of structural components having curved surface sections. The bleeder cloth according to the present invention comprises a textile-like non-woven fabric comprising polyester fibers locked into place by fiber interaction, the fabric having a regular repeating pattern of entangled fiber regions of higher area density than the average area density of the fabric and interconnecting fibers which extend between the dense entangled fiber regions and which are randomly entangled with each other in said regions, said fibers of the fabric being locked into place by a three-dimensional fiber entanglement characterized by a fiber-interlock value due to fiber entanglement of at least 7 with a fiber entanglement completeness of at least 0.5, said values being determined in the absence of binder, and wherein fibers in said regions turn, wind, twist back and forth, and pass about one another in all directions of said regions in such an intricate entanglement that fibers interlock with one another when the fabric is subjected to stress, to thereby provide coherency and strength to the fabric. Such a textile-like fabric, and the method of making same, is more fully disclosed in U.S. Pat. No. 3,485,706, the disclosure of which is hereby incorporated by reference in the subject application. By the term "bleeder cloth" is meant a cloth that has sufficient air porosity to allow the relatively free passage of air therethrough, good resin-holding capacity, and absence of any contaminants that might interfere with resin curing. It is distinguished from a "release coated fabric" or "release liner" which allows the passage of both air and resin therethrough, and which provides a surface that will not stick to the structural components being formed.

The bleeder cloth according to the present invention is easier to handle than the prior art fiberglass fabric, and can consistently produce curved-surface structural components of higher quality (less voids and more uniform surface areas) than the prior art. This is because the bleeder cloth according to the invention has excellent stretch and set properties for ready conformation around compound curves; there is no need to cut and fit the fabric, but rather the fabric is simply laid into a mold and it stretches and conforms when pressure is applied. Yet the bleeder cloth of the invention is capable of transmitting pressures that are imposed on it properly to the pre-impregnated fabric, which is essential in order for proper end product formation. The bleeder cloth according to the invention has the following properties which make it ideal as a bleeder cloth: sufficient air porosity to allow the escape of gases during curing and so that it does not become clogged prematurely as the resin cures; capacity to move the mobilized resin through its structure; sufficient resin holding capacity to prevent resin rich composite; clean and free of materials that may interfere with the curing of the resin; non-slip surface so that it will stay where placed; and elongation in both directions for conformability. Some of these properties are quantified as follows: Wt: about 1.9 oz/sq. yd.; elongation: 35–50% MD, 65–80% XD; Drape (Handlometer): 8 MD, 5 XD; Nonfibrous content: 0.5% (In the above MD means in the machine direction, and XD in the cross-machine direction).

An assembly for producing a fiber reinforced plastic structural component from a resin pre-impregnated partially cured fabric, comprises a first mold section having curved portions, and coated with a release layer, and adapted to receive at least one layer of the resin impregnated partially cured fabric on the interior thereof, a release coated fabric adapted to be disposed on the resin pre-impregnated fabric when the fabric is on the first mold section, at least one layer of bleeder cloth disposed on the release fabric, the bleeder cloth comprising a textile-like non-woven polyester fabric as described in U.S. Pat. No. 3,485,706, a second mold section, and means for evacuating gas from the area between the mold sections. The second mold section may comprise a male mold section comprising an expandable silcone rubber section, the male section transmitting pressure to the bleeder cloth and release fabric when pressure is applied thereto.

The method for producing a fiber reinforced plastic structural component having curved surface sections from a resin pre-impregnated, partially cured fabric, according to the present invention, comprises the steps of disposing at least one layer of the resin pre-impregnated fabric on a first mold section having curved portions, disposing a release coated fabric on the resin impregnated fabric, disposing at least one layer of the bleeder cloth according to the present invention on the release fabric to draw and hold excess resin from the resin impregnated fabric, disposing a second mold section over the at least one layer of bleeder cloth, applying pressure to all the components in the mold formed by the mold sections, and evacuating the gases through the release fabric and the at least one layer of bleeder cloth while heating all the components of the mold to completely cure the resin pre-impregnated fabric.

The fiber reinforced structural component with curved surface sections according to the present invention is a component produced by disposing at least one layer of resin pre-impregnated partially cured fabric on a first mold section, disposing a release coated fabric on the at least one layer of resin impregnated fabric, disposing at least one layer of bleeder cloth on the release fabric to draw and hold excess resin from the resin pre-impregnated fabric (the bleeder cloth being a polyester textile-like non-woven fabric as shown in U.S. Pat. No. 3,485,706), disposing a second mold section over the at least one layer of bleeder cloth, applying pressure to all the components in the mold formed by the mold sections, and evacuating gases through the release fabric and the at least one layer of bleeder cloth while heating all the components of the mold to completely cure the resin pre-impregnated fabric.

It is a primary object of the present invention to provide an improved assembly and method for producing an improved fiber reinforced structural component with curved surface sections. This and other objects of the invention will become clear from an inspection of the detailed description of the invention, and from the appended claims.

BRIEF DESCRIPTION OF THE DRAWINGS

FIG. 1 is a cross-sectional, schematic side view of an exemplary assembly according to the present invention;

FIG. 2 is a perspective view of an exemplary structural component that may be produced according to the present invention; and FIG. 3 is a perspective view of an exemplary dual arrangement of release fabric and bleeder cloth layers according to the present invention.

DETAILED DESCRIPTION OF THE INVENTION

An exemplary assembly for producing a fiber reinforced plastic structural component from a resin pre-impregnated partially cured fabric, is shown generally at 10 in FIG. 1. The assembly 10 generally includes a first (female) mold section 12, having curved surface portions 14 thereof, and coated on the interior thereof with a release coating (such as a silica spray like "Frekote 33") the mold section 12 being adapted to receive at least one layer 16 of resin pre-impregnated partially cured fabric on the interior 15 thereof, a release coated fabric 18 adapted to be disposed on the resin pre-impregnated fabric 16, at least one layer of bleeder cloth 20 according to the present invention disposed on the release fabric 18, a second (male) mold section 22, and means 26 for evacuating the gas from the area between the male 22 and female 12 mold sections. The fabric layer(s) 16 is pre-impregnated with an appropriate resin (i.e., epoxies, polyesters, etc.), and the resin is partially cured to a "B" stage before being disposed in the female mold section 12. The release coated fabric 18, which allows the passage of both air and resin therethrough and provides a surface that will not stick to the structural component being formed from the layers 16, may be selected from a wide variety of known materials, such as those shown in column 2, lines 49-52 of U.S. Pat. No. 3,513,015, or a commercially available product called "Burlease" 51789 available from Burlington Industrial Fabrics Company. Of course, other available release liners also are suitable.

The resin-impregnated partially cured fabric may be disposed on a male mold section and a female mold section disposed in contact with the bleeder cloth if desired.

The bleeder cloth 20 according to the present invention comprises a textile-like non-woven fabric comprising polyester fibers locked into place by fiber interaction, the fabric having a regular repeating pattern of entangled fiber regions of higher area density than the average area density of the fabric and interconnecting fibers which extend between the dense entangled fiber regions and which are randomly entangled with each other in said regions, said fibers of the fabric being locked into place by a three-dimensional fiber entanglement characterized by a fiber interlock value due to fiber entanglement of at least 7 with a fiber entanglement completeness of at least 0.5, the values being determined in the absence of binder, and wherein fibers in the regions turn, wind, twist back and forth and pass about one another in all directions of the regions in such an intricate entanglement that fibers interlock with one another when the fabric is subjected to stress to thereby provide coherency and strength to the fabric. Such a fabric, and the methods of making same, are shown in U.S. Pat. No. 3,485,706, the disclosure of which is hereby incorporated by reference in the present application. The bleeder cloth according to the present invention is soft and drapable, has good surface friction, and has excellent air porosity in single and multiple layers. It is also highly wettable by resins — for instance one layer of Burlflow 4819 bleeder cloth according to the invention has the same resin takeup as one layer of 181 Fiberglass, and the same resin take-up as two layers of 120 Fiberglass. It will form fit to a part very well because of its softness, drapability, and very high stretch properties. The fabric preferably has a weight of about 1.9 ounces per square yard, and has stretchability (elongation) in the machine direction of between about 35 and 50%, and the across machine direction between about 65 and 80%. Its drape (handleometer) in the machine direction is a minimum of 8, and the across machine direction a minimum of 5, and it has a non-fibrous content of about 0.5%. It is also capable of transmitting all the desired pressure that is applied to it by the male mold member 22 during formation of structural components according to the present invention. The bleeder cloth 20 according to the present invention has greatly improved stretch and drape characteristics over conventional fiberglass bleeder cloth, and additionally has improved air permeability and oleic acid wickability. The following table compares the air permeability of single and multiple layers of conventional exemplary fiberglass fabrics vs. commercially available bleeder cloth according to the present invention, and also compares their oleic acid wickability:

| PRIOR ART BLEEDER CLOTH | Weight | Thickness | MD XD Elongation | Drape | Extraction | Air Permeability cu.ft./min./sq.ft. 1 layer | 4 layers | Oleic Acid Wickability |
| --- | --- | --- | --- | --- | --- | --- | --- | --- |
| 181 Fiberglass | 8.9 | .080 | <2% | — | 0.5 | 49 | 17 | 36/16 |
| 120 Fiberglass | 3.2 | .035 | <2% | — | 0.5 | 114 | 38.5 | 30/16 |
| COMMERCIAL BLEEDER CLOTHS ACCORDING TO INVENTION | | | | | | | | |
| Burlflo 4829 1.9 oz. non-apertured | 1.9 | 0.016 | 35 × 65 | 15 × 5 | 0.5 | 222 | 54 | 69/16 |
| Burlflo 4819 napped | 1.9 | 0.019 | 35 × 65 | 8 × 5 | 0.5 | 281 | 74 | 52/16 |
| Burlflo 4824 2.4 oz. apertured hopsack | 2.2 | 0.022 | 40 × 100 | 12 × 3 | 0.5 | 245 | 73 | 78/16 |
| BURLFLO 4812 1.2 oz. non-apertured napped | 1.2 | 0.017 | 35 × 75 | 4 × 2 | 0.5 | 448 | 125 | 39/16 |
| Burlflo 4822 1.2 oz. non-apertured | 1.2 | 0.012 | 35 × 80 | 5 × 3 | 0.5 | 345 | 97 | 42/16 |
| Burlflo 4822A 1.2 oz. diamond-apertured | 1.3 | 0.13 | 35 × 80 | 8 × 3 | 0.5 | 625 | 232 | 60/16 |

The male mold section 22 of the assembly 10 preferably includes an expandable silicone rubber block although it may be a metal member. As pressure is applied to the top portion of the block 22 by any suitable mechanical or fluid pressure applying means 24, the block 22 expands and fills the mold cavity defined by the female mold section 12 with the fabric layers disposed on the interior thereof, thereby applying pressure to all the components in the mold. The release coated fabric 18 in the bleeder cloth 20 according to the present invention must be able to transmit the desired pressure that is imposed on them by the silicone rubber block 22.

The gas evacuation means 26 preferably include a flexible nylon film bag 28 or the like connected by connection 30 to a vacuum line 32, which in turn is connected up to a vacuum pump 34. The bag 28 may also comprise the female mold, and element 12 may be eliminated. Suitable means 35 are also provided for applying heat to the whole assembly 10. In practicing the method according to the present invention, pressure is applied to all the components of the mold by the male mold section 22 (and means 24) while simultaneously gases produced by the curing of the fabric layers 16 are evacuated through the release coated fabric 18 in bleeder cloth 20 by the vacuum pump 34, and while all the components are heated by the means 35 until complete curing of the resin pre-impregnated fabric 16 is effected. A specified amount of partially cured resin is bled away from the layers 18 under the influence of the vacuum pump 34 to control the resin to fiber ratio of the final product, the resin permeating through the bleeder cloth 20 according to the present invention and being entrapped thereby.

After curing is completed, the end product structural component 16' (see FIG. 2 for example) is separated from the mold, and the release liner 18 and bleeder cloth 20 contaminated with the excess unwanted resin are discarded. The structural component 16' that is produced has curved surface sections 36 thereof corresponding to the radii of curved portions 14 of the female mold member 12, and the product 16' according to the teachings of the present invention does not have access voidage therein and all of the curved surfaces 36 are smooth, the product 16' being improved over the prior art products.

It will be seen from the above description that the placement of the release liner 18 in bleeder cloth 20 according to the present invention and the female mold section is very simple, no cutting and forming thereof being necessary. In order to make such insertion even easier, a composite fabric structure 40 (see FIG. 3) may be provided, the composite 40 for example, consisting of one layer of release coated fabric 18 (such as "Burlease" 51 789) and 3 layers 20 of bleeder cloth according to the present invention (such as "Burlflo" 4819, a commercially available polyester textile like non-woven fabric according to the present invention, produced by Burlington Industrial Fabrics Company). Such a composite 40 may have a weight of 7.8 ounces per square yard, a thickness of 0.055 inches, and a non-fibrous content of 0.5%. The fabric 18 and the layers 20 are fused together at 42 at one edge thereof.

EXAMPLE

According to the present invention a male metal mold member having curved surfaces was coated with "Frekote 33", and 2 pieces of Narmco 3200 Type A and 1 piece of Narmco 3200 Type B were placed thereon as the prepeg 16, one layer of Burlease 51789 was disposed on the prepeg 16 as the release layer 18, and 3 layers of Burlflo 4819 were disposed on the release layer 18 as the bleeder cloth 20, Burlflo 4819 having the properties desired for a bleeder cloth according to the present invention. The whole arrangement was enclosed in a nylon bag 28 which functioned as a female mold section and as a component part of the means for evacuating gas through the bleeder cloth from between the mold sections. The bag 28 was sealed for vacuum and was placed in an autoclave and a vacuum of 25 inches was applied by a vacuum pump 34. Heat was applied at a rate of 2°/min. until a temperature of 265° F was reached at a pressure of 38 lbs./sq. in. The vacuum was then dumped, and the temperature held at 265° F for 1 hour, after which the components were allowed to gradually cool to room temperature. The nylon bag 28 was moved, and the release liner 18 grabbed at one edge and the bleeder cloth and release liner were peeled away from the finished perfect complex part which was now ready for use, having a resin content of about 30% and a fiber content of about 70%.

It will thus be seen that according to the present invention an assembly and method have been described which result in the production of improved fiber reinforced plastic structural components having curved surface sections from a resin pre-impregnated partially cured fabric. It will also be seen that according to the teachings of the present invention the production of such structural components is greatly facilitated according to the assembly and method of the present invention which utilize a textile-like non-woven polyester fabric bleeder cloth according to the present invention. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies, methods, and products.

What is claimed is:

1. A method for producing a fiber reinforced plastic structural component having curved surface sections from a resin pre-impregnated partially cured fabric, comprising the steps of
    a. disposing at least one layer of resin pre-impregnated partially cured fabric on a first mold section having curved portions,
    b. disposing a release-coated fabric on said at least one layer of resin impregnated fabric,
    c. disposing at least one layer of bleeder cloth on said release fabric to draw and hold excess resin from said resin pre-impregnated fabric, said bleeder cloth comprising a textile-like non-woven fabric comprising polyester fibers locked into place by fiber interaction, the fabric having a regular repeating pattern of entangled fiber regions of higher area density than the average area density of the fabric and interconnecting fibers which extend between the dense entangled fiber regions and which are randomly entangled with each other in said regions, said fibers of the fabric being locked into place by a three-dimensional fiber entanglement characterized by a fiber-interlock value due to fiber entanglement of at least 7 with a fiber entanglement completeness of at least 0.5, said values being determined in the absence of binder, and wherein fibers in said regions turn, wind, twist back and forth, and pass about one another in all directions of said regions in such an intricate entanglement that fibers interlock with one another when the fabric is subjected to stress, to thereby provide coherency and strength to the fabric;
    d. disposing second mold section over said at least one layer of bleeder cloth,
    e. applying pressure to all the components in the mold formed by said first and second mold sections, and
    f. evacuating the gases through said release fabric and said at least one layer of bleeder cloth while heating all the components of the mold to completely cure the resin pre-impregnated fabric.

2. A method as recited in claim 1 wherein said second mold section is a male mold section comprising an expandable block of silcone rubber, and wherein said step of applying pressure to all the components in the mold is accomplished by applying pressure to a top portion of said block thereby applying pressure to all the components in the mold.

3. A method as recited in claim 1 comprising the further step of encircling the mold with a vacuum bag, and wherein said step of evacuating the gases through said release fabric and bleeder cloth is accomplished by applying a vacuum to said vacuum bag.

4. A method as recited in claim 1 wherein said release-coated fabric is fused at one edge thereof to said at least one layer of bleeder cloth, and where said release-coated fabric and said at least one layer of bleeder cloth are disposed on a mold section simultaneously.

* * * * *

UNITED STATES PATENT OFFICE
CERTIFICATE OF CORRECTION

Patent No. 4,062,917   Dated December 13, 1977

Inventor(s) Thomas B. Hill and Charles Tomasino

It is certified that error appears in the above-identified patent and that said Letters Patent are hereby corrected as shown below:

Column 2, line 43, change "Handlqmeter" to -- Handle-O-Meter --.

Column 4, line 52, change "handleometer" to -- Handle-O-Meter --.

Signed and Sealed this

Fifteenth Day of January 1980

[SEAL]

Attest:

SIDNEY A. DIAMOND

Attesting Officer   Commissioner of Patents and Trademarks